(12) United States Patent
Bae et al.

(10) Patent No.: US 8,734,001 B2
(45) Date of Patent: May 27, 2014

(54) BACKLIGHT ASSEMBLY INCLUDING A LIGHT SOURCE COVER INCLUDING A SIDEWALL COVER PORTION WHICH CONTACTS WITH AN EXTERIOR SURFACE OF A SIDEWALL OF A RECEIVING CONTAINER AND A LIGHT SOURCE COVER PORTION WHICH COVERS A LIGHT SOURCE AND A PORTION OF THE EXITING SURFACE OF A LIGHT GUIDE PLATE, DISPLAY DEVICE HAVING THE SAME AND METHOD OF ASSEMBLING THE DISPLAY DEVICE

(75) Inventors: Hyun-Chul Bae, Cheonan-si (KR); Cheol-Yong Noh, Cheonan-si (KR); Seong-Sik Choi, Seoul (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 119 days.

(21) Appl. No.: 13/227,080

(22) Filed: Sep. 7, 2011

(65) Prior Publication Data
US 2012/0206942 A1 Aug. 16, 2012

(30) Foreign Application Priority Data
Feb. 16, 2011 (KR) .................. 10-2011-0013552

(51) Int. Cl.
*G09F 13/04* (2006.01)
*F21V 15/01* (2006.01)

(52) U.S. Cl.
USPC .......... 362/632; 362/97.1; 362/97.2; 362/600

(58) Field of Classification Search
USPC ................. 362/294.1, 632, 555, 85
See application file for complete search history.

(56) References Cited

U.S. PATENT DOCUMENTS

| | | | |
|---|---|---|---|
| 2004/0004424 A1 | 1/2004 | Sakurai | |
| 2006/0093825 A1* | 5/2006 | Lee et al. | 428/411.1 |
| 2010/0149835 A1* | 6/2010 | Cho et al. | 362/612 |
| 2012/0050636 A1* | 3/2012 | Jeong et al. | 349/58 |

FOREIGN PATENT DOCUMENTS

| | | |
|---|---|---|
| EP | 2042897 | 4/2009 |
| KR | 1020070055750 A | 5/2007 |
| KR | 10-2008-0028581 | 4/2008 |
| KR | 1020080038910 A | 5/2008 |
| KR | 1020090054722 A | 6/2009 |
| KR | 0962122 | 6/2010 |
| WO | 2006080201 | 8/2006 |

OTHER PUBLICATIONS

Myeong-U Jeong, Korean Patent Publication 10-2007-005575,May 2007,machine translation.*

(Continued)

*Primary Examiner* — Tracie Y Green
(74) *Attorney, Agent, or Firm* — F. Chau & Associates, LLC (57) ABSTRACT

A backlight assembly includes a receiving container, a first light source module and a first light source cover. The receiving container includes a bottom portion, a first sidewall and a second sidewall connected to the bottom portion. The first light source module is supported by the bottom portion and adjacent to the first side wall. The first light source cover makes contact with an exterior surface of the first sidewall. The first light source cover surrounds the second sidewall so that a first end portion of the first light source cover covers the first light source module.

21 Claims, 8 Drawing Sheets

(56) References Cited

OTHER PUBLICATIONS

English Abstract from Korean Intellectual Property Office for KR10-2008-0028581.

European Search Report dated May 13, 2014 from corresponding European Patent Application No. 13160260.9-1904.
English Abstract from Korean Intellectual Property Office for KR10-2008-0028581, Apr. 2008.

* cited by examiner

BACKLIGHT ASSEMBLY INCLUDING A LIGHT SOURCE COVER INCLUDING A SIDEWALL COVER PORTION WHICH CONTACTS WITH AN EXTERIOR SURFACE OF A SIDEWALL OF A RECEIVING CONTAINER AND A LIGHT SOURCE COVER PORTION WHICH COVERS A LIGHT SOURCE AND A PORTION OF THE EXITING SURFACE OF A LIGHT GUIDE PLATE, DISPLAY DEVICE HAVING THE SAME AND METHOD OF ASSEMBLING THE DISPLAY DEVICE

CROSS-REFERENCE TO RELATED APPLICATION

This application claims priority under 35 U.S.C. §119 to Korean Patent Application No. 2011-0013552, filed on Feb. 16, 2011, the disclosure of which is hereby incorporated by reference herein in its entirety.

BACKGROUND OF THE INVENTION

1. Technical Field

Example embodiments of the present invention relate to a backlight assembly, a display device having the backlight assembly and a method of assembling the display device. More particularly, example embodiments of the present invention relate to a backlight assembly capable of preventing light leakage, a display device having the backlight assembly and a method of assembling the display device.

2. Description of the Related Art

A liquid crystal display ("LCD") device may display an image using a liquid crystal that has optical characteristics such as, for example, anisotropy of refractivity and electrical characteristics such as anisotropy of dielectric constant. LCD devices may include an LCD panel displaying an image using optical transmittance of liquid crystal molecules and a backlight assembly providing light to the LCD panel.

The backlight assembly includes a light source generating lights required for displaying an image on the LCD panel. The backlight assembly may employ, for example, a cathode fluorescent lamp ("CCFL"), a flat fluorescent lamp ("FFL"), a light-emitting diode ("LED"), etc., as the light source. The LED may have benefits such as, for example, a high light-emitting efficiency, a long lifetime, a low power consumption, eco-friendly characteristics, etc., and thus the LED has been employed in various fields.

Backlight assemblies are mainly classified into a direct downward type backlight assembly and an edge type backlight assembly in accordance with the disposal of the light source. The direct downward type backlight assembly includes a plurality of light sources that are disposed below the display panel. The edge type backlight assembly includes a light guide plate ("LGP") and a light source disposed at the side of the LOP.

In the case of the edge type backlight assembly, to prevent a modification of the LGP disposed at a side of the light source due to heat generated from the light source, the LGP is disposed to be spaced apart from the light source by a predetermined interval. The light source and a lower surface of the LGP may be blocked by a reflection plate, and an upper surface of the LGP may be blocked by a mold frame. However, a gap may be generated between the upper surface of the light source and the mold frame, so that light may be leaked through the gap so that light loss may be generated.

Thus, there is a need in the art for a backlight assembly which may prevent light leakage and which has increased light incident efficiency and also for a display device having the above-mentioned backlight assembly and a method of assembling the above-mentioned display device.

SUMMARY OF THE INVENTION

Example embodiments of the present invention provide a backlight assembly which prevents lights from leaking to increase the light incident efficiency.

Example embodiments of the present invention also provide a display device having the above-mentioned backlight assembly.

Example embodiments of the present invention further also provide a method of assembling the above-mentioned display device.

According to an example embodiment of the present invention, a backlight assembly includes a receiving container, a first light source module and a first light source cover. The receiving container includes a bottom portion, first sidewall and a second sidewall connected to the bottom portion. The first light source module is supported by the bottom portion to be adjacent to the first side wall. The first light source cover makes contact with an exterior surface of the first sidewall. The first light source cover surrounds the second sidewall so that a first end portion of the first light source cover covers the first light source module.

In an example embodiment, the first light source cover may include a sidewall cover portion, a lower end portion and a light source cover portion. The sidewall cover portion may make contact with the exterior surface of the first sidewall. The lower end portion may be bent from a first side of the sidewall cover portion to make partial contact with the bottom portion. The light source cover portion may be bent from an opposite side of the first side of the sidewall cover portion toward a direction identical to a bent direction of the lower end portion to be opposite to the lower end portion, and the light source cover portion may be disposed on the first light source module.

In an example embodiment, the backlight assembly may further include a light guide plate comprising an incident surface facing the first light source module and an exiting surface in which light incident into the incident surface exits. The light source cover portion may be extended from the opposite side of the sidewall cover portion toward the light guide plate to cover the first light source module and a portion of the exiting surface.

In an example embodiment, the backlight assembly may further include a second light source module disposed to face the first sidewall in adjacent to the first light source module. The first light source module may include a plurality of first light sources, a first driving substrate, and a first connector. The first light sources may be arranged along the first sidewall. The first driving substrate having the first light sources mounted thereon may be formed. The first connector may be formed on a first end portion of the first driving substrate to be connected to a first connection wiring transmitting a driving voltage for driving the first light sources. The second light source module may include a plurality of second light sources, a second driving substrate, and a second connector. The second light sources may be arranged along an arrangement direction of the first light sources. The second driving substrate has the second light sources mounted thereon. The second connector may be formed on a first end portion of the second driving substrate to be connected to a second connection wiring transmitting a driving voltage for driving the second light sources.

In an example embodiment, the backlight assembly may further include a heat radiating plate disposed between the first and second light source modules and the receiving container. In this case, the first and second light source modules may be disposed along a direction parallel with a long side of the heat radiating plate, the first connector may be formed on a position corresponding to a first end portion of the heat radiating plate, and the second connector may be formed on a position corresponding to a second end portion opposite to the first end portion of the heat radiating plate on which the first connector is disposed.

In an example embodiment, the backlight assembly may further include a second light source module and a second light source cover. The second light source module may face a second sidewall disposed along an opposition direction of the first sidewall of the receiving container. The second light source cover may make contact with an exterior surface of the second sidewall. The second light source cover may surround the second sidewall so that a first end portion of the second light source cover covers the second light source module.

According to an example embodiment of the present invention, a display device includes a display panel and a backlight assembly. The display panel displays images. The backlight assembly includes a first light source module, a receiving container and a first light source cover. The first light source module provides the display panel with lights. The receiving container includes a first sidewall facing the first light source module and a bottom portion connected to the first sidewall. The first light source cover makes contact with an exterior surface of the first sidewall. The first light source cover surrounds the first sidewall so that a first end portion of the first light source cover covers the first light source module.

In an example embodiment, the display device may further include a top chassis. The top chassis may include a panel supporting portion fixing an edge portion of the display panel and chassis sidewalls extended from the panel supporting portion. In this case, an interior surface of the chassis sidewall corresponding to the first sidewall may make contact with an exterior surface of the first light source cover.

According to an example embodiment of the present invention, there is provided a method of assembling a display device. In the method, a light source module is disposed on an inner space of a receiving container comprising a bottom portion and a sidewall connected to the bottom potion to face the sidewall. The light source cover is combined with the receiving container so that the light source cover makes contact with an exterior surface of the sidewall to cover the light source module and a portion of the bottom portion. A display panel is disposed on the receiving container on which the light source cover is combined.

In an example embodiment, the light source cover may include a sidewall cover portion, a light source cover portion bent from a first end portion of the sidewall cover portion and a lower end portion bent from a second end portion of the sidewall cover portion. In this case, the sidewall cover portion may be moved in a first direction toward the sidewall in parallel with a sidewall of the receiving container, and then a portion of the receiving container on which the light source module is received may be disposed on an inner space of the light source cover, so that the sidewall cover portion makes contact with the sidewall, the light source cover portion covers the light source module, and the lower end portion makes contact with the bottom portion.

In an example embodiment, a top chassis, which includes a panel supporting part and chassis sidewalls, may be moved on the display panel along a direction substantially perpendicular to the first direction. The top chassis may be combined with the receiving container, so that the panel supporting part makes contact with an edge portion of the display panel, and an inner surface of the chassis sidewall corresponding to the sidewall of the receiving container facing the light source module makes contact with the light source cover.

According to an example embodiment, a backlight assembly is provided. The backlight assembly includes a receiving container including a bottom portion, a first sidewall and a second sidewall connected to the bottom portion, with the first sidewall and the second sidewall extending from edge portions of the bottom portion to form a receiving space within the receiving container, a light guide plate including an incident surface and an exiting surface in which light incident into the incident surface exits, a plurality of optical sheets disposed on the light guide plate, a light source unit disposed at a sidewall of the light guide plate and including a first light source module having a plurality of first light sources, and a heat radiating plate disposed between the light source unit and the receiving container. The light source unit is attached to an upper surface of the heat radiating plate. The backlight assembly further includes a reflection plate disposed between the light guide plate and the heat radiating plate, with the reflection plate contacting with a portion of the heat radiating plate, and the optical sheets, the light guide plate, the light source unit, the heat radiating plate and the reflection plate are each received within the receiving space of the receiving container and the first light sources of light source unit are disposed adjacently to the first sidewall within the receiving space. In addition, the backlight assembly further includes a first light source cover including an opening portion and composed of a reflective material to reflect light emitted from the first and second light sources toward the light incident portion of the light guide plate. The first sidewall of the receiving container, the first light sources and a portion of the exiting surface of the light guide plate are each received within the first light source cover through the opening portion, such that the first light cover makes contact with an exterior surface of the first sidewall and surrounds the first sidewall, the first light sources and the portion of the exiting surface of the light guide plate.

According to a backlight assembly, a display device having the backlight assembly and a method of assembling the display device of example embodiments of the present invention, a light source cover covers a light source module and a portion of a light guide plate adjacent to the light source module, so that lights may be prevented from leaking between the light source module and the light guide plate to increase the efficiency of incident light.

BRIEF DESCRIPTION OF THE DRAWINGS

Exemplary embodiments of the present invention will become more apparent by describing in detailed example embodiments thereof with reference to the accompanying drawings, in which.

DETAILED DESCRIPTION OF EXEMPLARY EMBODIMENTS OF THE INVENTION

Hereinafter, exemplary embodiments of the present invention will be explained in detail with reference to the accompanying drawings.

Figure 1:
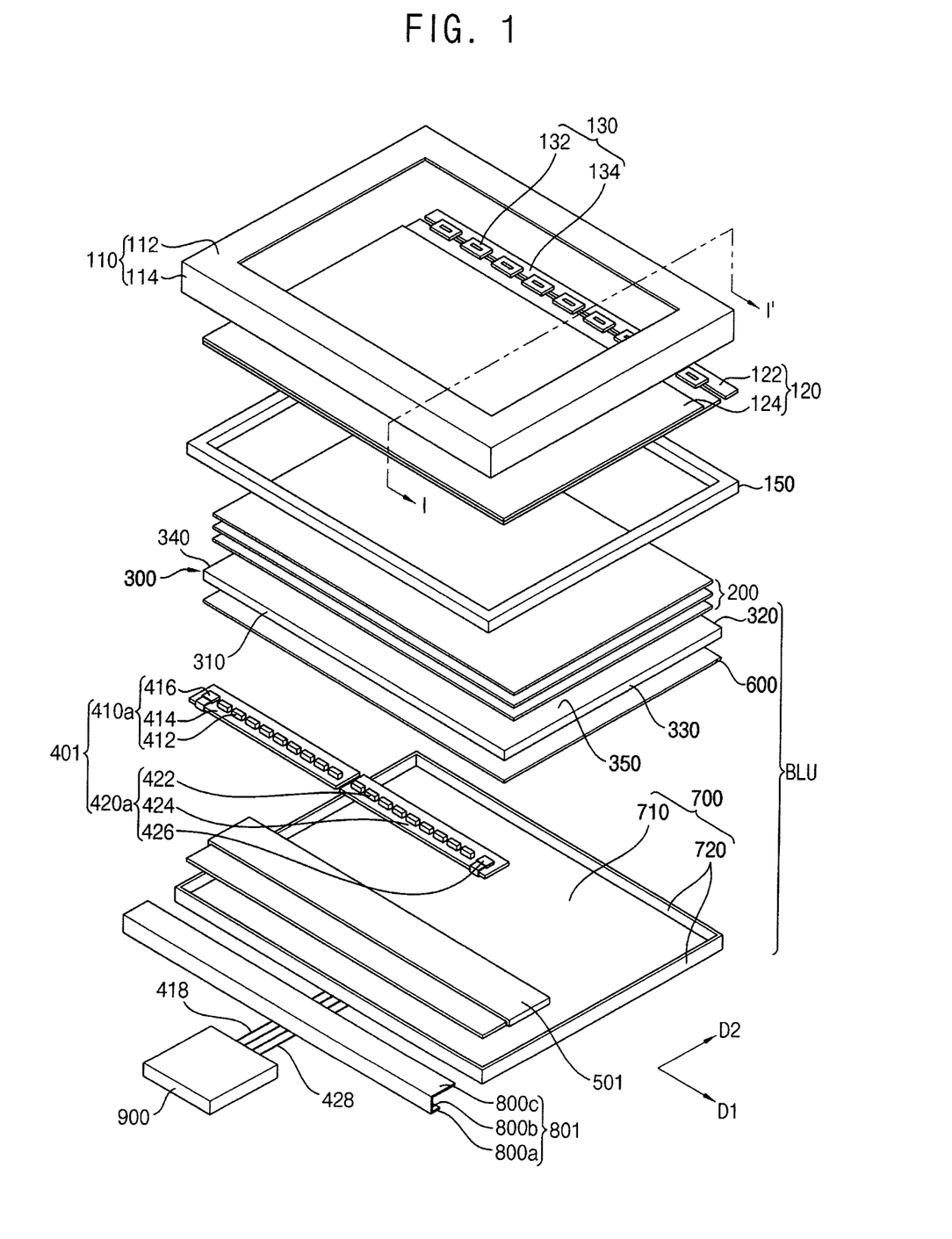
FIG. 1 is an exploded perspective view illustrating a display device according to an exemplary embodiment of the present invention.
Figure 2:
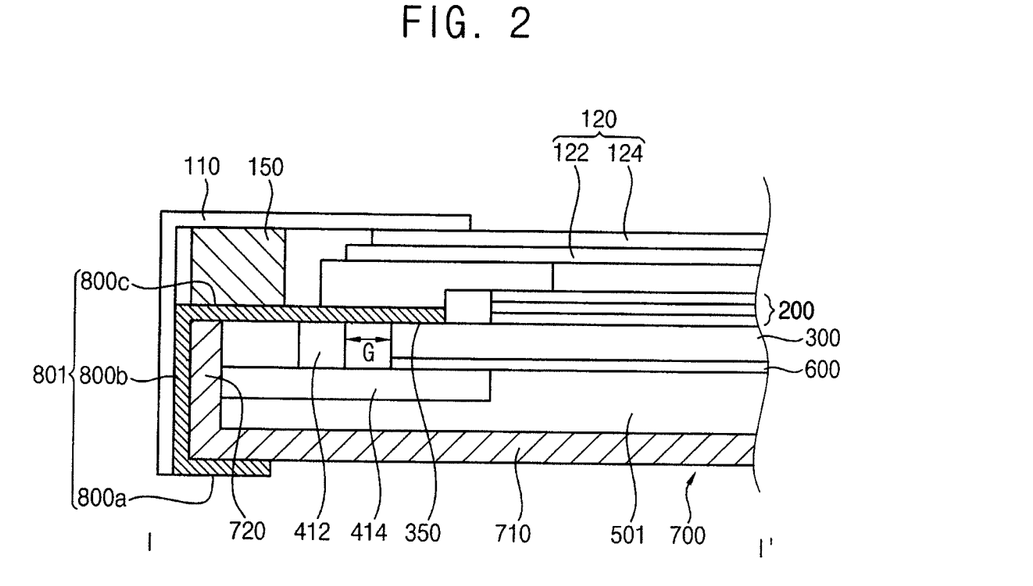
FIG. 2 is a cross-sectional view taken along a line I-I' of FIG. 1.

FIG. 1 is an exploded perspective view illustrating a display device according to an exemplary embodiment of the present invention. FIG. 2 is a cross-sectional view taken along a line I-I' of FIG. 1.

Referring to FIGS. 1 and 2, a display device according the present exemplary embodiment includes a top chassis 110, a display panel 120, a panel driving part 130, a mold frame 150 and a backlight assembly BLU.

The top chassis 110 is disposed on the display panel 120 to protect the display panel 120 from an external impact. The top chassis 110 includes a panel supporting part 112 which supports edge portions of the panel 120 and plural chassis sidewalls 114 extended from the edge portions of the panel supporting part 112. A window exposing a display area of the display panel 120 is formed through an upper surface of the top chassis 110.

The display panel 120 may include a first substrate 122, a second substrate 124 facing the first substrate 122, and a liquid crystal layer (not shown) interposed between the first and second substrates 122 and 124. The display panel 120 may have, for example, a rectangular shape with a long side and a short side. It is noted that exemplary embodiments of the present invention are not limited to a display panel having a rectangular shape but rather the shapes of the display panel 120 may be varied as is understood by one skilled in the art.

The panel driving part 130 drives the display panel 120. The panel driving part 130 may include, for example, a chip film package 132, a gate driving part (not shown) and a source printed circuit board ("PCB") 134 electrically connected to the chip film package 132 and the gate driving part. The chip film package 132 provides data lines formed on the first substrate 122 with data signals. The gate driving part provides gate lines formed on the first substrate 122 with gate signals. The gate driving part may be mounted, for example, on the first substrate 122 as in the chip film package type. Alternatively, the gate driving part may, for example, be directly formed the first substrate 122 as in an integrated circuit type.

A support surface is formed on the mold frame 150 in a frame shape, thereby supporting edge portions of the display panel 120. The mold frame 150 fixes the display panel 120.

The backlight assembly BLU is disposed below the display panel 120 to provide the display panel 120 with lights.

The backlight assembly BLU may include, for example, plural optical sheets 200, a light guide plate ("LGP") 300, a light source unit 401, a heat radiating plate 501, a reflection plate 600, a receiving container 700 and a light source cover 801.

The optical sheets 200 are disposed on the LGP 300 to increase the light efficiency of lights incident from the LGP 300. The optical sheets 300 may include, for example, a diffusion sheet, a prism sheet and a light condensing sheet.

The LGP 300 guides lights emitted from the light source unit 401 toward the display panel 120. The LGP 300 includes a first side surface 310 corresponding to a long side of the display panel 120, a second side surface 320 facing the first side surface 310, a third side surface 330 corresponding to a short side of the display panel 120, and a fourth side surface 340 facing the third side surface 330. In the present exemplary embodiment, a thickness of the LGP 300 may be substantially uniform. However, the thickness of the LGP 300 is not limited to that exemplary embodiment, and the LGP 300 may be manufactured in various shapes.

The light source unit 401 may be disposed, for example, at the first side surface 310 of the LGP 300. Alternatively, the light source unit 401 may, for example, be disposed at the second side surface 320 of the LGP 300. The light source unit 401 may include a first light source module 410a and a second light source module 420a. The first and second light source modules 410a and 420a may be disposed to be spaced apart from a center portion of the LGP 300 by a predetermined interval along a first direction D1 substantially parallel with a long side of the display panel 120. The first light source module 410a may include plural first light sources 412 and a first driving substrate 414 on which the first light sources 412 are mounted. The second light source module 420a may include plural second light sources 422 and a second driving substrate 424 on which the second light sources 422 are mounted. The first and second light sources 412 and 422 may include, for example, a light-emitting diode. A description of the light source unit 401 will be described refer to FIG. 3.

The heat radiating plate 501 is disposed between the light source unit 401 and the receiving container 700 to increase a contact size between the light source unit 401 and the receiving container 700. The heat radiating plate 501 may, for example, be formed to overlap with a portion of the LGP 300 adjacent to the light source unit 401. Alternatively, for example, the heat radiating plate 501 may be formed to overlap with a whole area of the LGP 300. The light source unit 401 is combined with an upper surface of the heat radiating plate 501. A bottom surface of the heat radiating plate 501 is combined with a bottom portion 710 of the receiving container 700. The heat radiating plate 501 delivers heat delivered from the light source unit 401 to the receiving container 700. The heat radiating plate 501 may include a metallic material having a high thermal conductivity. For example, the heat radiating plate 501 may include aluminum (Al). The heat radiating plate 501 may be combined with the light source unit 401 and the receiving container 700 by, for example, a screw. Alternatively, the heat radiating plate 501 may be combined with the receiving container 700 using, for example, an adhesive (not shown). Other means known by those skilled in the art besides screws and adhesives may also be used for combining the heat radiating plate 501 with the light source unit 401 and the receiving container 700.

The reflection plate 600 is disposed between the LGP 300 and the heat radiating plate 501 to reflect lights leaked from the LGP 300. The reflection plate 600 may directly contact with a portion of the heat radiating plate 501.

The receiving container 700 includes the bottom portion 710 and plural sidewalls 720 extended from edge portions of the bottom portion 710 to faun a receiving space. The receiving container 700 receives the optical sheets 200, the LGP 300, the light source unit 401, the heat radiating plate 501 and the reflection plate 600. The receiving container 700 may include, for example, a metallic material.

The light source cover 801 surrounds a sidewall 720 adjacent to the light source unit 401, the first and second light sources 412 and 422 and a portion of the exiting surface 350 of the LGP 300. For example, the light source cover 801 may have a U-shape having an opening portion 806. (See FIG. 5D). A sidewall 720 adjacent to the light source unit 401, the first and second light sources 412 and 422 and a portion of the exiting surface 350 may be inserted into the opening portion of the light source cover 801. The light source cover 801 includes, for example, a lower end portion 800a, a sidewall cover portion 800b and a light source cover portion 800c. The lower end portion 800a makes contact with a bottom portion 710 of the receiving container 700. The sidewall cover portion 800b is extended from the lower end portion 800a to make contact with an exterior surface of the sidewall 720 of the receiving container 700. The light source cover portion 800c is extended from the sidewall cover portion 800b along a direction of the LGP 300 to make contact with the first and second light sources 412 and 422 and a portion of the LGP 300. The light source cover portion 800c surrounds a portion of an exiting surface 350 adjacent to an incident portion of the LGP 300. An interior surface of the light source cover portion 800c makes contact with the exiting surface 350 adjacent to the incident portion of the LGP 300. The light source cover 801 may be made of, for example, a material comprising stainless steel or brass. The light source cover 801 reflects lights emitted from the first and second light sources 412 and 422 toward a light incident portion of the LGP 300.

The LGP 300 and the reflection plate 600 are disposed to be spaced apart from the first and second light sources 412 and 422 by a predetermined interval G. For example, the interval G may be about 0.5 mm.

The driving circuit substrate 900 includes a driving circuit (not shown) which generates a driving voltage for driving the first and second light sources 412 and 422. The driving circuit substrate 900 is connected to the first and second light source modules 410 and 420 through first and second connection wirings 418 and 428. The driving circuit substrate 900 may be disposed at a rear surface of the receiving container 700. However, it is noted that exemplary embodiments of the present invention are not limited to the above-mentioned placement of the driving circuit substrate 900 but rather the location of the driving circuit substrate 900 may be varied in accordance with exemplary embodiments of the present invention as is understood by one skilled in the art.

Figure 3:
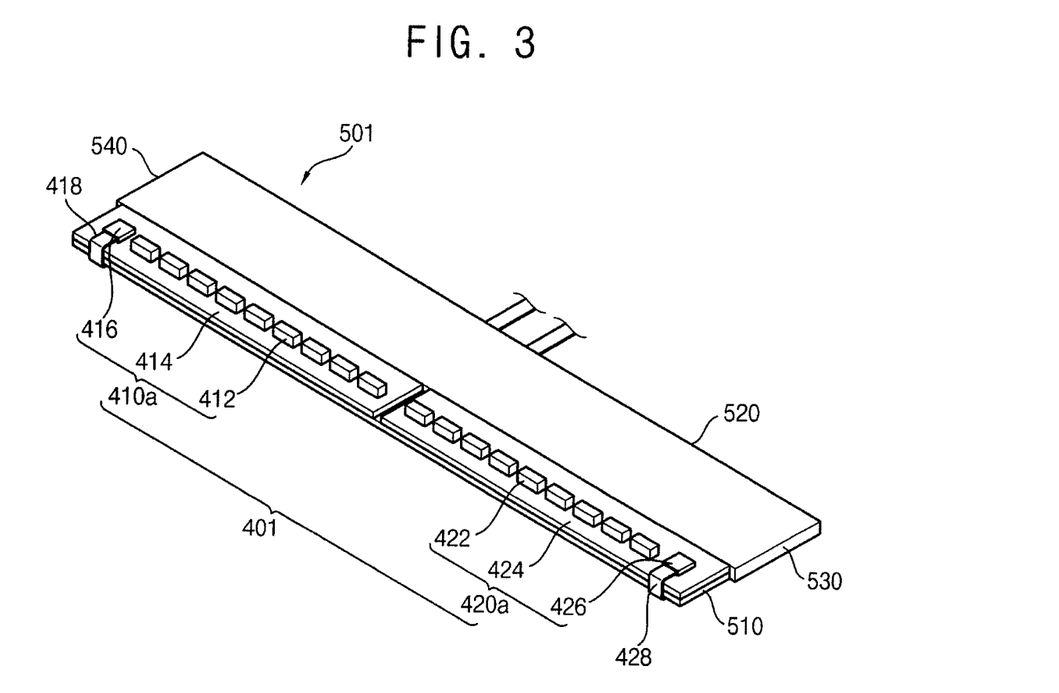
FIG. 3 is a perspective view illustrating a light source module and a heat radiating plate of FIG. 3.
Figure 4:
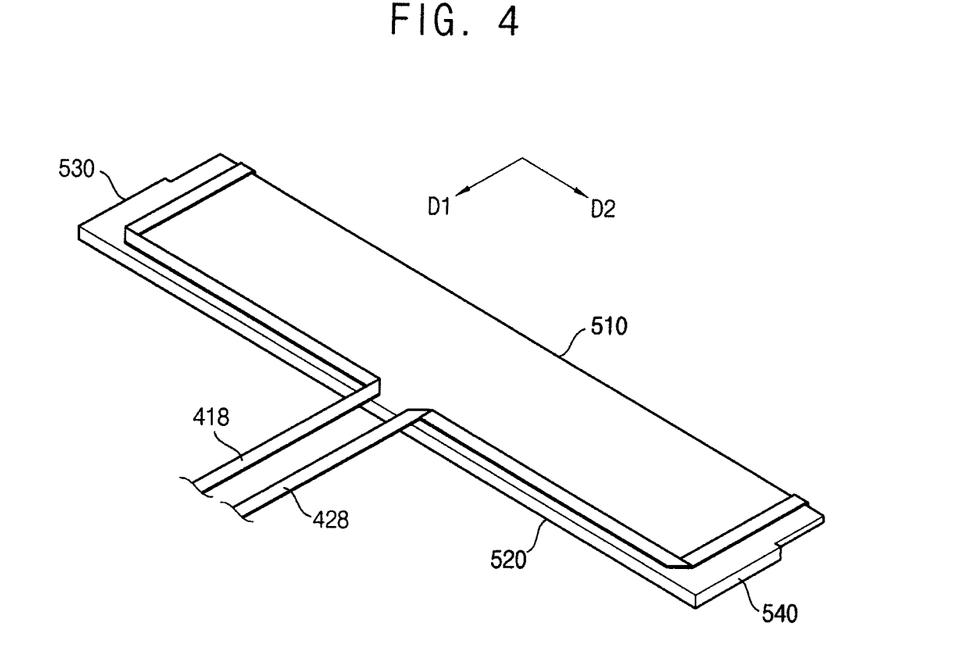
FIG. 4 is a rear perspective view illustrating a heat radiating plate of FIG. 3.

FIG. 3 is a perspective view illustrating a light source module and a heat radiating plate of FIG. 3. FIG. 4 is a rear perspective view illustrating a heat radiating plate of FIG. 3;

Referring to FIGS. 3 and 4, a light source unit 401 includes, for example, a first light source module 410a and a second light source module 420a. The first and second light source modules 410a and 420a are combined with an upper portion of a heat radiating plate 501. The first and second light source modules 410a and 420a are spaced apart from each other by a predetermined interval along a direction parallel with a long side of the heat radiating plate 501. The first light source module 410a includes, for example, a plurality of light sources 412, a first driving substrate 414 and a first connector 416. The first light sources 412 are spaced apart from each other by a predetermined interval along a direction parallel with a long side of the first driving substrate 414. A wiring pattern (not shown) for providing a driving voltage to the first light sources 412 is formed on the first driving substrate 414.

The first connector 416 is electrically connected to a first connection wiring 418 delivering the driving voltage.

The second light source module 420a includes, for example, plural second light sources 422, a second driving substrate 424 and a second connector 426. The second light sources 422 are spaced apart from each other by a predetermined interval and formed along a direction parallel with a long side of the second driving substrate 424. A wiring pattern (not shown) for providing a driving voltage to the second light sources 422 is formed on the second driving substrate 424. The second connector 426 is electrically connected to a second connection line 428. The first and second driving substrates 414 and 424 may be, for example, a printed circuit board ("PCB") or a metal core PCB ("MCPCB"). The first and second connection wirings 418 and 428 may be, for example, a flexible flat cable ("FFC").

The heat radiating plate 501 includes a first side surface 510, a second side surface 520, a third side surface 530 and a fourth side surface 540. The first side surface 510 is adjacent to an area on which the first and second light source modules 410a and 420a are combined. The second side surface 520 faces the first side surface 510. The third side surface 530 is substantially perpendicular to the first side surface 510. The fourth side surface 540 faces the third side surface 530. The first connector 416 is formed on a position corresponding to a first end portion of the first side surface 510 of the heat radiating plate 501, and the second connector 426 is formed on a position corresponding to a second end portion opposite to the first end portion of the first side surface 510. The first and second connection wirings 418 and 428 are bent toward a rear surface of the heat radiating plate 501 to be inserted between the heat radiating plate 501 and the bottom portion 710 of the receiving container 700.

As shown in FIG. 4, the first connection wiring 418 bent toward the rear surface of the heat radiating plate 501 is extended in a first direction D1 along an area adjacent to the third side surface 530. The first connection wiring 418 is bent in a direction of the second side surface 520 at an end portion of the third side surface 530, and then the first connection wiring 418 is extended in a second direction D2 substantially perpendicular to the first direction D1. The first connection wiring 418 is again bent in the first direction D1 at a central position of the second side surface 520, and then the first connection wiring 418 is extended in the first direction D1. The first connection wiring 418 is drawn out toward a rear surface of the receiving container 700 through an opening hole (not shown) formed through the bottom portion 710 of the receiving container 700.

The second connection wiring 428 bent toward the rear surface of the heat radiating plate 501 is extended in the first direction D1 along an area adjacent to the fourth side surface 540. The second connection wiring 428 is bent in a direction of the second side surface 520 at an end portion of the fourth side surface 540, and then the second connection wiring 428 is extended along the second side surface 520. The second connection wiring 428 is bent in the first direction D1 at a central position of the second side surface 520, and then the second connection wiring 428 is extended in the first direction D1. The second connection wiring 428 is drawn out toward the rear surface of the receiving container 700 through an opening hole (not shown) formed through the bottom portion 710 of the receiving container 700.

It is noted that exemplary embodiments of the present invention are not limited to above-mentioned specific directions and positions for the first connection wiring 418 and the second connection wiring 428 but rather the positions and directions for the first connection wiring 418 and the second connection wiring 428 may be varied in accordance with exemplary embodiments of the present invention as is understood by one skilled in the art.

FIGS. 5A, 5B, 5C and 5D are cross-sectional views for explaining an assembling method of a display device of FIG. 2.

Figure 5A:
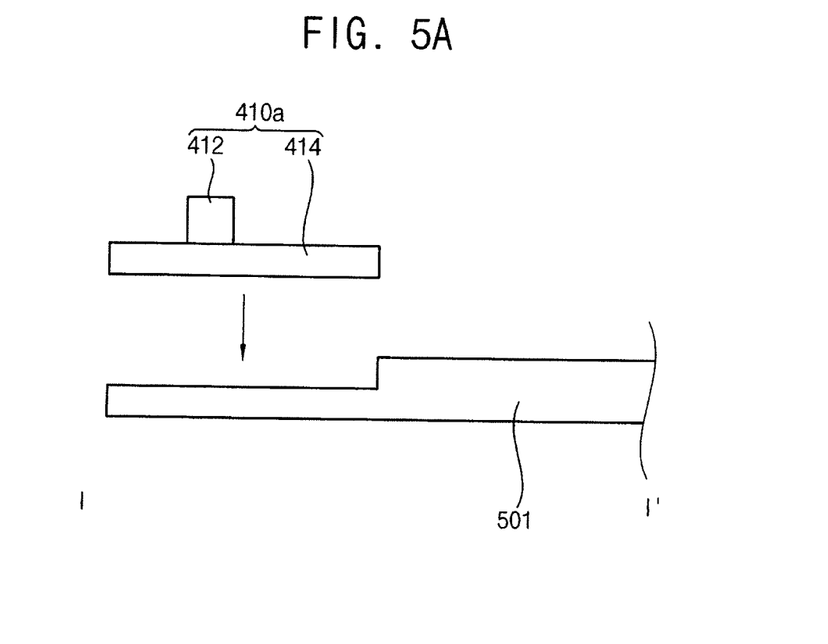
FIGS. 5A, 5B, 5C and 5D are cross-sectional views for explaining an assembling method of a display device of FIG. 2.

Referring to FIGS. 2 and 5A, the first light source module 410a is fixed on the heat radiating plate 501. The heat radiating plate 501 and the first light source module 410a may be combined with each other using, for example, a screw. A combining method of the heat radiating plate 501 and a second light source module (not shown) is substantially the same as a combining method of the first light source module 410a, and thus a detailed description of a combining method of the second light source module (not shown) will be omitted.

Figure 5B:
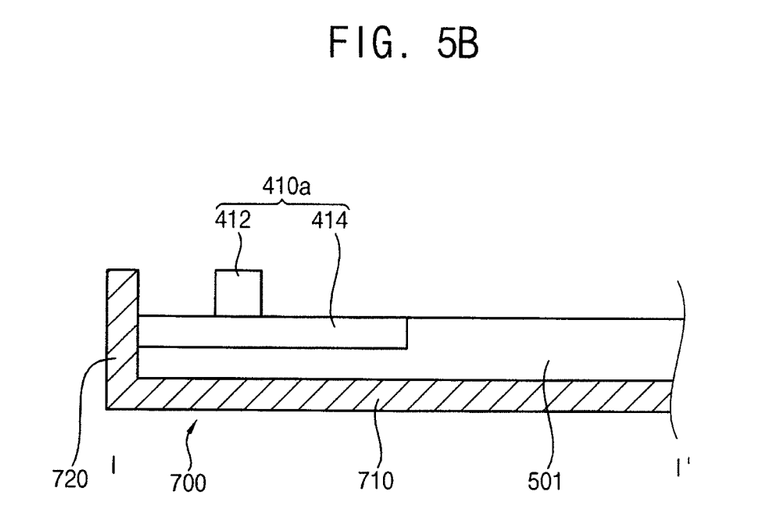

Referring to FIGS. 2 and 5B, the receiving container 700 receives the heat radiating plate 501 on which the first light source module 410a is combined. The heat radiating plate 501 may be combined with a bottom portion 710 of the receiving container 700 using, for example, a screw. It is noted that other means besides screws known by those skilled in the art may also be used for combining the heat radiating plate 501 with the first light source module 410a and for combining the heat radiating plate 501 with the bottom portion 710 of the receiving container 700.

Figure 5C:
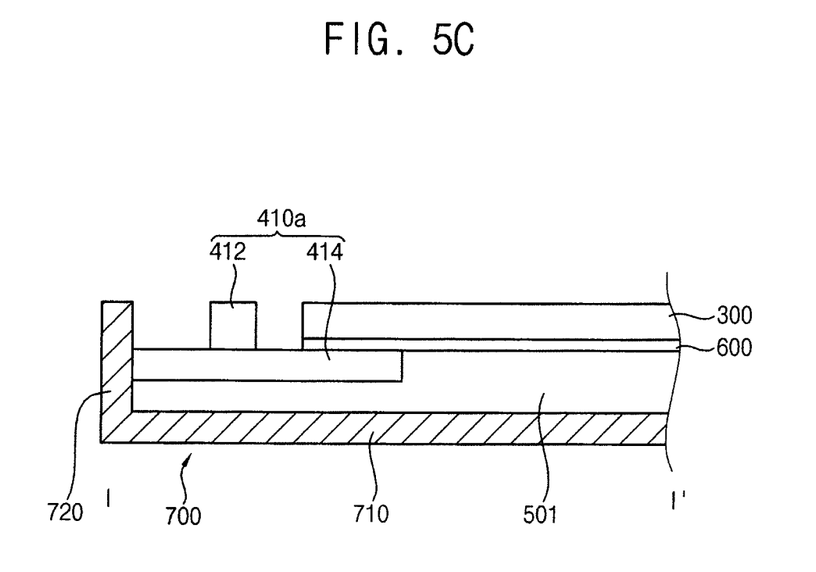

Referring to FIGS. 2 and 5C, the reflection plate 600 and the LGP 300 are received on the receiving container 700 on which the heat radiating plate 501 is received. The reflection plate 600 and the LGP 300 are spaced apart from the first light sources 412 of the first light source module 410a by a predetermined interval.

Figure 5D:
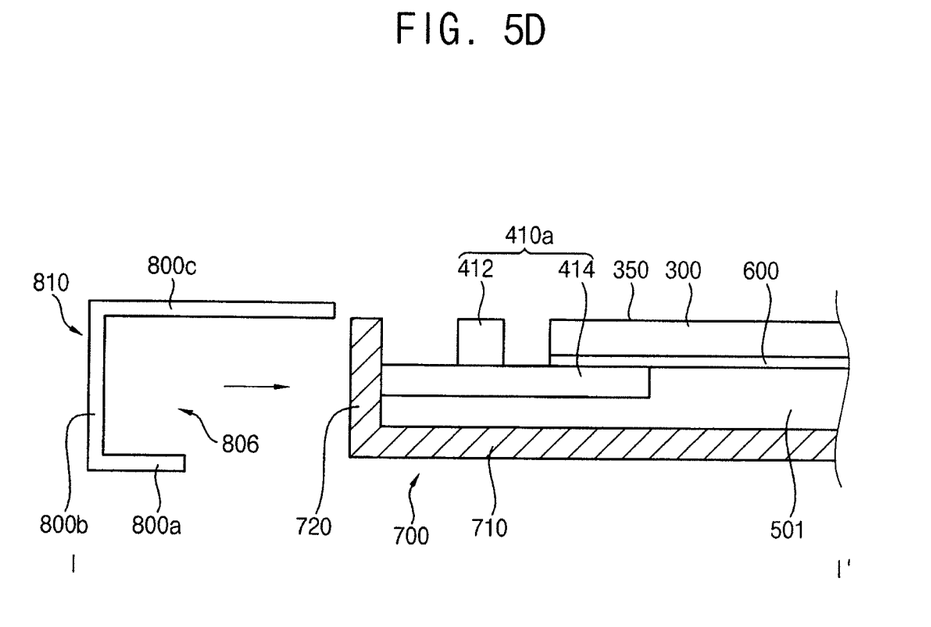

Referring to FIGS. 2 and 5D, the light source cover 801 is combined with the receiving container 700 on which the reflection plate 600 and the LGP 300 are received. The light source cover 801 is combined to cover a sidewall 720 of the receiving container 700 corresponding to an area on which the first light source module 410a is received and a portion of the light exiting surface 350 adjacent to the first light sources 412 and the light incident portion of the LGP 300 within the opening portion 806 of the light source cover 801.

Then, as shown in FIG. 2, the mold frame 150, the optical sheets 200, the display panel 120 and the top chassis 110 are sequentially combined with the receiving container 700 on which the light source cover 801 is combined. A chassis sidewall 114, which corresponds to a sidewall 720 of the receiving container 700 adjacent to the first light source module 410a, makes contact with the light source cover 801.

According to the present exemplary embodiment, the light source cover 801 covers a portion of the exiting surface 350 of the LGP 300 adjacent to the first and second light sources 412 and 422, so that lights may be prevented from leaking between the first and second light sources 412 and 422 and the LGP 300. The light source cover 801 is formed from a material having a high reflectivity reflectance to reflect lights generated from the first and second light sources 412 and 422 toward the LGP 300, thereby increasing the efficiency of incident light.

Figure 6:
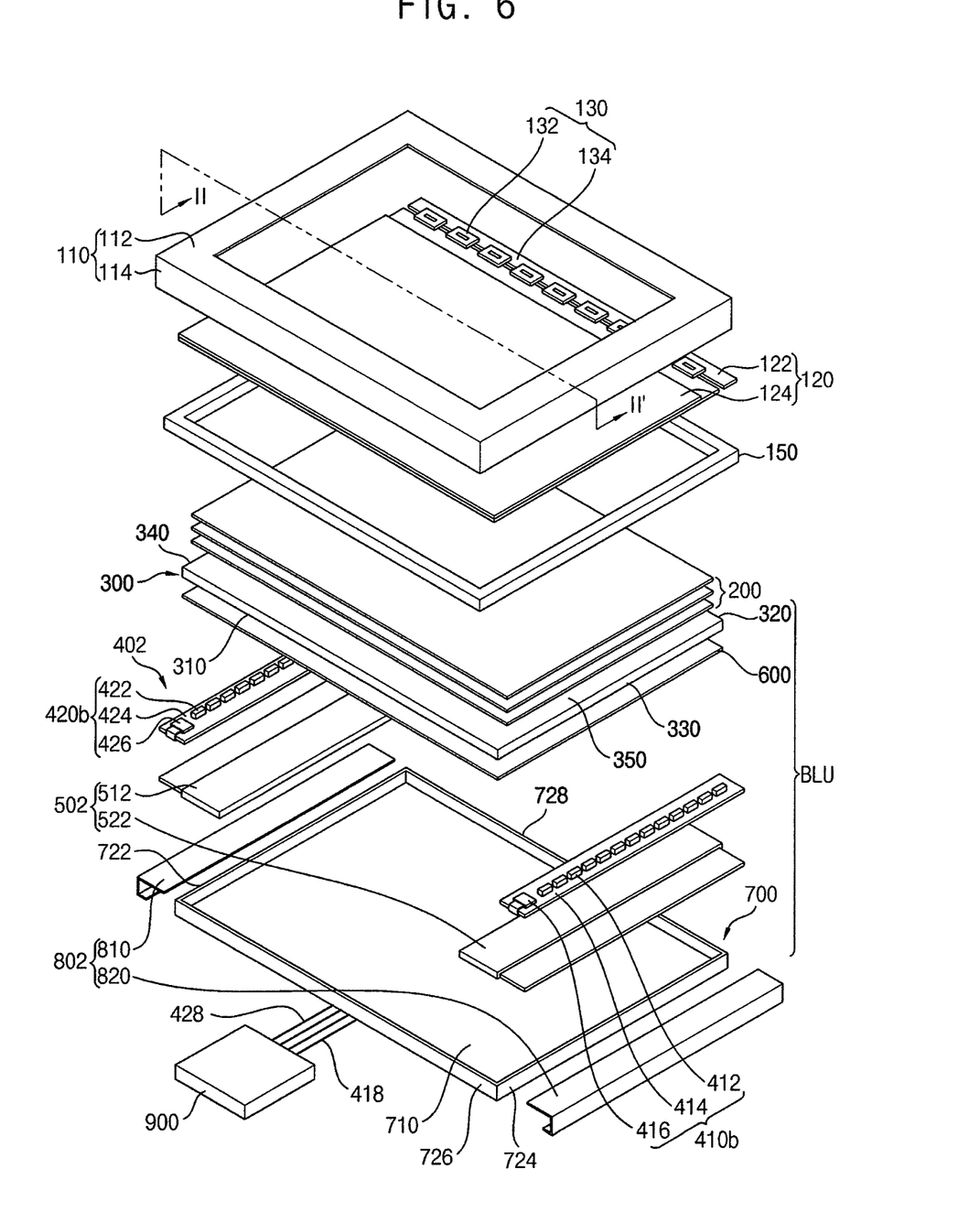
FIG. 6 is an exploded perspective view illustrating a display device according to an exemplary embodiment of the present invention.
Figure 7:
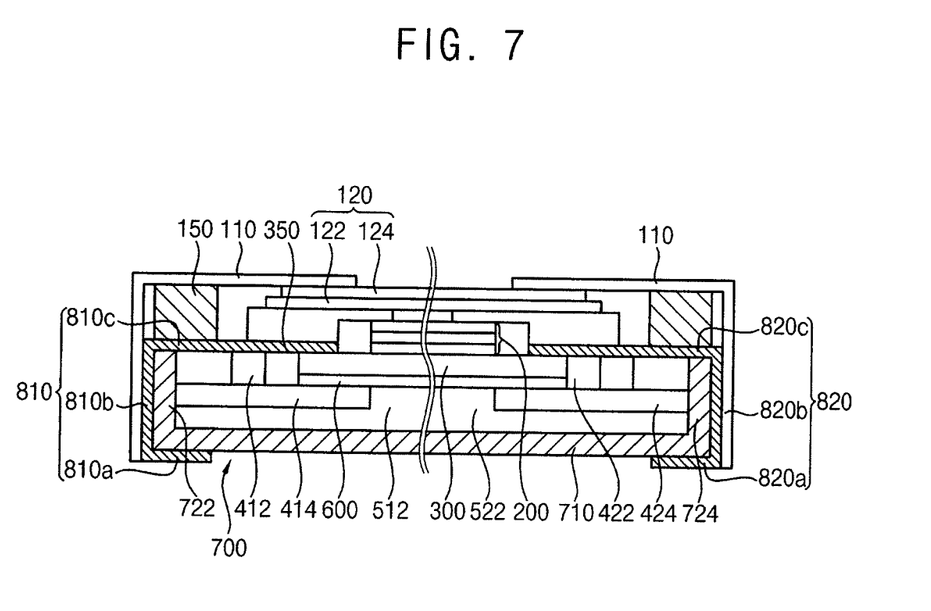
FIG. 7 is a cross-sectional view taken along a line II-II' of FIG. 6.

FIG. 6 is an exploded perspective view illustrating a display device according to an exemplary embodiment of the present invention. FIG. 7 is a cross-sectional view taken along a line II-II' of FIG. 6.

A display device according to the present exemplary embodiment is substantially the same as the display device of FIG. 1 except for least a light source unit 402, a heat radiating unit 502 and a light source cover unit 802. Thus, a detailed description thereof will be omitted.

Referring to FIGS. 6 and 7, a display device according to the present exemplary embodiment includes a backlight assembly BLU. The backlight assembly BLU includes, for example, a light source unit 402, a heat radiating unit 502, a light source cover unit 802 and a receiving container 700. The light source unit 402 includes, for example, an LGP 300, a first light source module 410b and a second light source module 420b. The heat radiating unit 502 includes, for example, a first heat radiating plate 512 and a second heat radiating plate 522.

The first light source module 410b is disposed at a first side surface of the LGP 300 which corresponds to a direction parallel with a short side of the display panel 120. For example, the first light source module 410b may be disposed at a third side surface 330 of the LGP 300. The first light source module 410b includes, for example, a plurality of first light sources 412 generating lights, a first driving substrate 414 on which the first light sources 412 are mounted, and a first connector 416 connected to a first connection wiring 418 to receive a driving voltage for driving the first light sources 412. The first connection wiring 418 is electrically connected to a driving circuit substrate 900 disposed at a rear surface of the receiving container 700 to receive the driving voltage from the driving circuit substrate 900.

The second light source module 420b is disposed at a second side surface facing the first side surface of the LGP 300. For example, the second light source module 420b may be disposed at a fourth side surface 340 of the LGP 300. The second light source module 420b includes, for example, a plurality of second light sources 422 generating lights, a second driving substrate 424 on which the second light sources 422 are mounted, and a second connector 426 connected to a second connection wiring 428 to receive a driving voltage for driving the second light sources 422. The second connection wiring 428 is electrically connected to the driving circuit substrate 900 disposed at a rear surface of the receiving container 700 to receive the driving voltage from the driving circuit substrate 900.

The first connector 416 is formed at a first end portion of the first driving substrate 414, and the second connector 426 is formed at a first end portion of the second driving substrate 424 facing the first end portion of the first driving substrate 414. The first and second connection wirings 418 and 428 may include, for example, a flexible flat cable ("FFC").

The first heat radiating plate 512 is disposed between the first light source module 410b and the receiving container 700, and the second heat radiating plate 522 is disposed between the second light source module 420b and the receiving container 700. The second heat radiating plate 512 is received on a bottom portion 710 adjacent to a first sidewall 722 of the receiving container 700, and the second heat radiating plate 522 is received on a bottom portion 710 adjacent to a second sidewall 724 facing the first sidewall 722 of the receiving container 700. Heat delivered from the first and second light source modules 410b and 420b are delivered to the receiving container 700 through the first and second heat radiating plates 512 and 522. The first and second heat radiating plates 512 and 522 may include, for example, a metallic material having a high thermal conductivity. For example, the first and second heat radiating plates 512 and 522 may include aluminum (Al). The first and second light source modules 410b and 420b may be combined with the first and second heat radiating plates 512 and 522 by, for example, a screw. The first and second heat radiating plates 512 and 522 may be combined with the receiving container 700 by, for example, a screw. Alternatively, the first and second heat radiating plates 512 and 522 may be combined with the receiving container

700 by, for example, an adhesive (not shown). However, other means known by those skilled in the art besides screws and adhesives may also be used for combining the first and second light source modules 410b and 420b with the first and second heat radiating plates 512 and 522 and for combining first and second heat radiating plates 512 and 522 with the receiving container 700.

In the present exemplary embodiment, it is described that the heat radiating plate 502 includes the first and second heat radiating plates 512 and 522 that are separated from each other; however, it is not limited to that exemplary embodiment. That is, the heat radiating unit 502 may be formed, for example, as in a plate structure so as to overlap with a whole area of the LGP 300.

The first and second connection wirings 418 and 428 are bent toward a rear surface of the first and second heat radiating plates 512 and 522 disposed below the first and second light source modules 410b and 420b, so that the first and second connection wirings 418 and 428 are interposed between the first and second heat radiating plates 512 and 522 and the bottom portion 710 of the receiving container 700.

Figure 8:
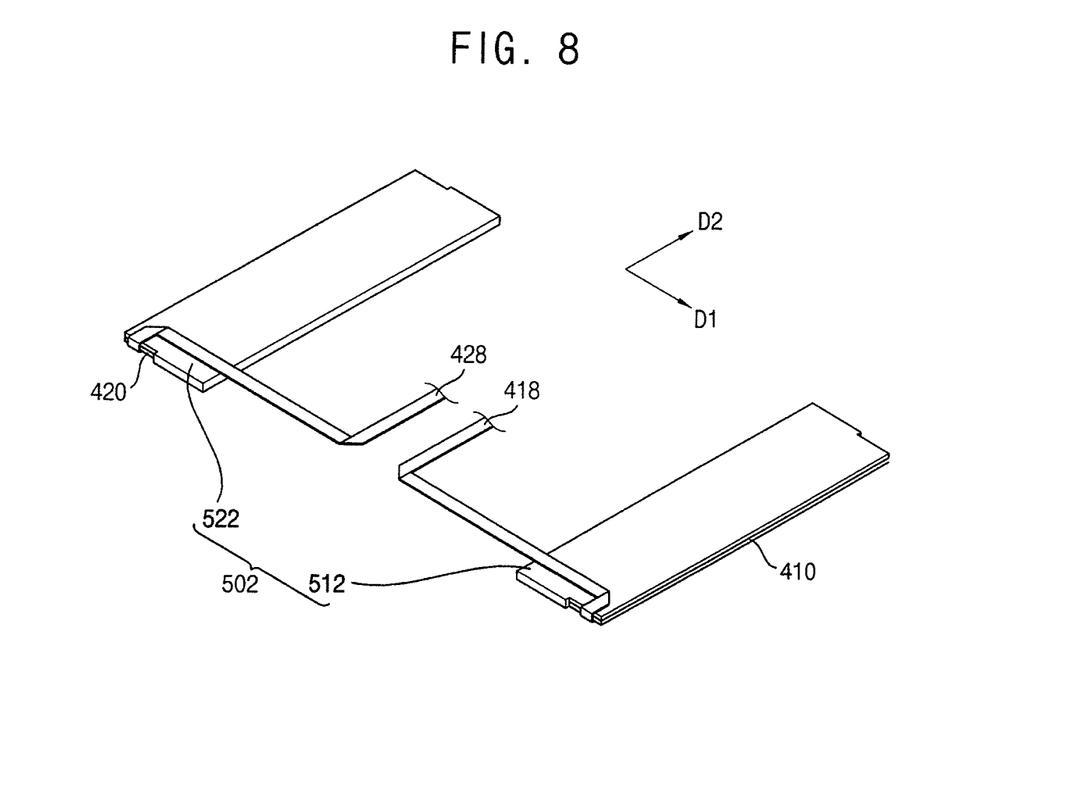
FIG. 8 is a rear perspective view illustrating first and second heat radiating plates for explaining first and second connection wirings of FIG. 6.

FIG. 8 is a rear perspective view illustrating first and second heat radiating plates for explaining first and second connection wirings of FIG. 6.

Referring to FIGS. 6 and 8, the first connection wiring 418 bent toward a rear surface of the first heat radiating plate 512 is bent in a first direction D1 that is substantially parallel to a short side of the first heat radiating plate 512, and then the first connection wiring 418 is extended in the first direction D1 along an edge portion of the first heat radiating plate 512. The first connection wiring 418 extended in the first direction D1 is again bent in a second direction D2 substantially perpendicular to the first direction D1 at a central portion between the first and second heat radiating plates 512 and 522, and then the first connection wiring 418 is extended in the second direction D2.

The second connection wiring 428 bent toward a rear surface of the second heat radiating plate 512 is bent in an opposite direction of the first direction D1, and then the second connection wiring 428 is extended to the central portion between the first and second heat radiating plates 512 and 522 along an edge portion of the second heat radiating plate 512. The second connection wiring 428 extended to the central portion is again bent in the second direction D2, and then the second connection wiring 428 is extended in the second direction D2. It is noted that exemplary embodiments of the present invention are not limited to above-mentioned specific directions and positions for the first connection wiring 418 and the second connection wiring 428 but rather the positions and directions for the first connection wiring 418 and the second connection wiring 428 may be varied in accordance with exemplary embodiments of the present invention as is understood by one skilled in the art.

Although not shown in FIGS. 6 and 8, the first and second connection wirings 418 and 428 are drawn out toward the rear surface of the receiving container 700 through an opening hole formed through the bottom portion of the receiving container 700.

Referring again to FIGS. 6 and 7, the light source cover unit 802 includes a first light source cover 810 and a second light source cover 820.

The first light source cover 810 surrounds an exterior surface of the first sidewall 722 of the receiving container 700 on which the first light source module 410b is received, and a portion of an exiting surface 350 of the LGP 300 adjacent to the first light source module 410b. For example, the first light source cover 810 may have a U-shape having an opening portion. A first sidewall 722, the first light source 412 and a portion of the exiting surface 350 of the LGP 300 may be inserted into the opening portion of the first light source cover 810. The first light source cover 810 includes, for example, a first lower end portion 810a, a first sidewall cover portion 810b and a first light source cover portion 810c. The first lower end portion 810a makes contact with a bottom portion 710 of the receiving container 700. The first sidewall cover portion 810b is bent at the first lower end portion 810a to make contact with an exterior surface of the first sidewall 722 of the receiving container 700. The first light source cover portion 810c is bent from the first sidewall cover portion 810b along a direction of the LGP 300, so that the first light source cover portion 810c makes contact with a portion of the LGP 300. The first light source cover portion 810c suppresses a portion of the exiting surface 350 adjacent to the light incident portion of the LGP 300 facing the first light sources 412 of the first light source module 410b.

The second light source cover 820 surrounds an exterior surface of the second sidewall 724 of the receiving container 700 on which the second light source module 420b is received, and a portion of the LGP 300 adjacent to the second light source module 420b. For example, the second light source cover 820 may have a U-shape having an opening portion. The second sidewall 724, the second light sources 422 and a portion of the exiting surface 350 of the LGP 300 may be inserted into the opening portion of the second light source cover 820. The second light source cover 820 includes, for example, a second lower end portion 820a, a second sidewall cover portion 820b and a second light source cover portion 820c. The second lower end portion 820a makes contact with a bottom portion 710 of the receiving container 700. The second sidewall cover portion 820b is bent at the second lower end portion 820a to make contact with an exterior surface of the second sidewall 724 of the receiving container 700. The second light source cover portion 820c is bent from the second sidewall cover portion 820b along a direction of the LGP 300, so that the second light source cover portion 820c makes contact with the second light sources 422 and a portion of the LGP 300. The second light source cover portion 820c suppresses a portion of the exiting surface 350 adjacent to the light incident portion of the LGP 300 facing the second light sources 422 of the second light source module 420b.

The first light source cover 810 and the second light source cover 820 each may be formed of a material having a high reflectivity such that the first light source cover 810 reflects light generated from the first light sources 412 toward the light incident portion of the LGP 300 and the second light source cover 820 reflects light generated from the second light sources 422 toward the light incident portion of the LGP 300. For example, the first light source cover 810 and the second light source cover 820 may each made of a material including stainless steel or brass.

Figure 9:
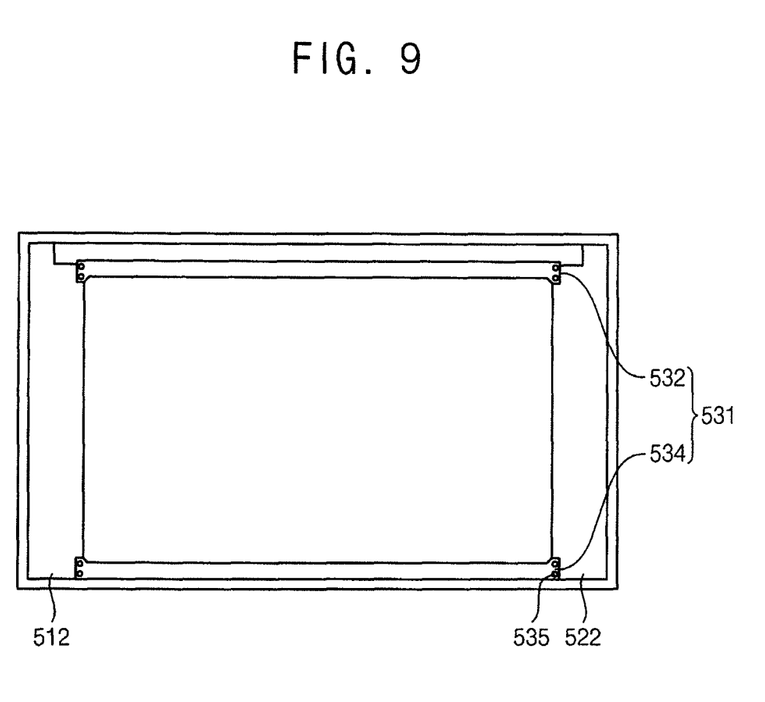
FIG. 9 is a plan view illustrating a receiving container of FIG. 7.

FIG. 9 is a plan view illustrating a receiving container of FIG. 7.

Referring to FIGS. 6 and 9, the display device may further include a reinforcing member 531. The reinforcing member 530 includes, for example, a first reinforcing member 532 and a second reinforcing member 534. The first and second reinforcing members 532 and 534 are received on the bottom portion 710 of the receiving container 700. The first reinforcing member 532 is extended along an extending direction of a third sidewall 726 which connects the first and second sidewalls 722 and 724 of the receiving container 700. The second reinforcing member 534 is extended along an extending direction of a fourth sidewall 728 facing the third sidewall 726 of the receiving container 700.

The first and second reinforcing members 532 and 534 are combined with the first and second heat radiating plates 512 and 522 that are received on the bottom portion 710 of the receiving container 700. For example, the first reinforcing member 532 is combined with first end portions of the first and second heat radiating plates 512 and 522, and the second reinforcing member 534 is combined with second end portions of the first and second heat radiating plates 512 and 522. The first and second reinforcing members 532 and 534 may be combined with the first and second heat radiating plates 512 and 522 by, for example, a screw. For combining the first and second reinforcing members 532 and 534, the first and second reinforcing members 532 and 534 may include plural combining holes 535 that are formed through corresponding areas.

According to the present exemplary embodiment, the first and second reinforcing members 532 and 534 are disposed on an area where the first and second heat radiating plates 512 and 522 are not received on the bottom portion 710 of the receiving container 700, so that the strength of the receiving container 700 may be enhanced.

As described above, according to exemplary embodiments of the present invention, a light source cover covers a light source module and a portion of an LGP adjacent to the light source module, so that lights may be prevented from leaking between the light source module and the LGP. Moreover, lights generated from the light source module through the light source cover are reflected to the light incident portion of the LGP, so that the efficiency of incident light may be enhanced. Furthermore, first and second reinforcing members are disposed on an area of the bottom portion of the receiving container in which the receiving container is not located, so that the strength of a receiving container may be reinforced.

Having described the exemplary embodiments of the present invention, it is further noted that it is readily apparent to those of reasonable skill in the art that various modifications may be made without departing from the spirit and scope of the invention which is defined by the metes and bounds of the appended claims.

What is claimed is:

1. A backlight assembly comprising:
a receiving container comprising a bottom portion and a first sidewall being connected to the bottom portion;
a first light source module disposed on the bottom portion and comprising a first driving substrate and a first light source being mounted to the first driving substrate;
a light guide plate comprising an incident surface facing the first light source module and an exiting surface in which light incident into the incident surface exits; and
a first light source cover comprising a sidewall cover portion which contacts with a surface of the first sidewall, a light source cover portion which covers the first light source and a portion of the exiting surface of the light guide plate, and a lower end portion which is bent from a first side of the sidewall cover portion,
wherein the lower end portion contacts with the bottom portion and extends to the sidewall cover portion.

2. The backlight assembly of claim 1, further comprising:
a second light source module disposed facing the first sidewall and adjacent to the first light source module,
wherein the first light source comprises a plurality of light sources arranged along the first sidewall,
wherein the first light source module further comprises a first connector formed on a first end portion of the first driving substrate and connected to a first connection wiring which is adapted to transmit a driving voltage for driving the first light source, and
wherein the second light source module comprises:
a plurality of second light sources arranged along an arrangement direction of the first light sources;
a second driving substrate on which the second light sources are mounted; and
a second connector formed on a first end portion of the second driving substrate and connected to a second connection wiring which is adapted to transmit a driving voltage for driving the second light sources.

3. The backlight assembly of claim 2, further comprising:
a heat radiating plate disposed between the first and second light source modules and the receiving container.

4. The backlight assembly of claim 3, wherein:
the first and second light source modules are disposed along a direction parallel with a long side of the heat radiating plate,
the first connector is formed on a position corresponding to a first end portion of the heat radiating plate, and
the second connector is formed on a position corresponding to a second end portion opposite to the first end portion of the heat radiating plate on which the first connector is disposed.

5. The backlight assembly of claim 1, further comprising:
a second light source module facing a second sidewall disposed along an opposite direction to the first sidewall of the receiving container; and
a second light source cover making contact with an exterior surface of the second sidewall, the second light source cover surrounding the second sidewall so that a first end portion of the second light source cover covers the second light source module.

6. The backlight assembly of claim 5, further comprising:
a first heat radiating plate disposed between the first light source module and the receiving container; and
a second heat radiating plate disposed between the second light source module and the receiving container and spaced apart from the first heat radiating plate by a predetermined interval.

7. The backlight assembly of claim 6, wherein the first light source comprises a plurality of light sources arranged along the first sidewall,
the first light source module further comprises a first connector formed on a first end portion of the first driving substrate and connected to a first connection wiring which is adapted to transmit a driving voltage for driving the first light source;
the second light source module comprises:
a plurality of second light sources facing the first light sources;
a second driving substrate on which the second light sources are mounted; and
a second connector formed on a first end portion of the second driving substrate facing the first end portion of the first driving substrate and connected to a second connection wiring which is adapted to transmit a driving voltage for driving the second light sources; and
the first and second connection wirings are bent toward a rear surface of the first and second heat radiating plates and are combined with the first and second driving substrates and wherein the first and second connection wirings combined with the first and second driving substrates are disposed between rear surfaces of the first and second heat radiating plates and the bottom portion of the receiving container.

8. The backlight assembly of claim 6, further comprising:
a first reinforcing member and a second reinforcing member formed on the bottom portion of the receiving container, the first and second reinforcing members extending along a direction substantially perpendicular to an extending direction of the first and second heat radiating plates.

9. A display device comprising:
a display panel adapted to display images; and
a backlight assembly comprising:
a receiving container comprising a bottom portion and a first sidewall being connected to the bottom portion;
a first light source module disposed on the bottom portion and comprising a first driving substrate and a first light source being mounted to the first driving substrate;
a light guide plate comprising an incident surface facing the first light source module and an exiting surface in which light incident into the incident surface exits; and
a first light source cover comprising a sidewall cover portion which contacts with a surface of the first sidewall, a light source cover portion which covers the first light source and a portion of the exiting surface of the light guide plate, and a lower end portion which is bent from a first side of the sidewall cover portion,
wherein the lower end portion contacts with the bottom portion and extends to the sidewall cover portion.

10. The display device of claim 9, wherein the backlight assembly further comprises:
a second light source module disposed facing the first sidewall and adjacent to the first light source module,
wherein the first light source comprises a plurality of light sources arranged along the first sidewall,
wherein the first light source module further comprises a first connector formed on a first end portion of the first driving substrate and connected to a first connection wiring transmitting a driving voltage for driving the first light sources,
wherein the second light source module comprises:
a plurality of second light sources arranged along the first light sources;
a second driving substrate on which the second light sources are mounted; and
a second connector formed on a first end portion of the second driving substrate and connected to a second connection wiring which is adapted to transmit a driving voltage for driving the second light sources.

11. The display device of claim 10, wherein the backlight assembly further comprises:
a heat radiating plate disposed between the first and second light source modules and the receiving container to deliver heat generated from the first and second light source modules to the receiving container,
the first and second light source modules are disposed along a direction parallel with a long side of the heat radiating plate,
the first connector is formed on a position corresponding to a first end portion of the heat radiating plate, and
the second connector is formed on a position corresponding to a second end portion opposite to the first end portion of the heat radiating plate on which the first connector is disposed.

12. The display device of claim 9, wherein the backlight assembly further comprises:
a second light source module facing a second sidewall disposed at an opposite direction to the first sidewall; and
a second light source cover making contact with an exterior surface of the second sidewall, the second light source cover surrounding the second sidewall so that a first end portion of the second light source cover covers the second light source module.

13. The display device of claim 12, wherein the backlight assembly further comprises:
a first heat radiating plate disposed between the first light source module and the receiving container; and
a second heat radiating plate disposed between the second light source module and the receiving container and spaced apart from the first heat radiating plate by a predetermined interval.

14. The display device of claim 9, further comprising:
a top chassis comprising a panel supporting portion fixing an edge portion of the display panel and chassis sidewalls extending from the panel supporting portion,
wherein an interior surface of the chassis sidewall corresponding to the first sidewall makes contact with an exterior surface of the first light source cover.

15. A method of assembling a display device, the method comprising:
disposing a light source module on an inner space of a receiving container comprising a bottom portion and a sidewall connected to the bottom portion to face the sidewall, the light source module comprising a first driving substrate and a first light source being mounted to the first driving substrate;
disposing a light guide plate in the receiving container in which the light source module is provided, wherein the light guide plate includes an incident surface facing the light source module and an exiting surface in which light incident into the incident surface exits;
combining the light source cover with the receiving container so that the light source cover makes contact with an exterior surface of the sidewall to cover the light source module and a portion of the bottom portion; and
disposing a display panel on the receiving container on which the light source cover is combined,
wherein the light source cover comprises a sidewall cover portion which contacts with a surface of the sidewall and a light source cover portion which covers the light source and a portion of the exiting surface of the light guide plate,
wherein the light source cover further comprises a lower end portion which is bent from a second end portion of the sidewall cover portion, and
the lower end portion contacts with the bottom portion and extends to the sidewall cover portion.

16. The method of claim 15, wherein the light source cover portion is bent from a first end portion of the sidewall cover portion,
wherein combining the light source cover with the receiving container, comprises:
moving the sidewall cover portion in a first direction toward the sidewall in parallel with a sidewall of the receiving container; and
disposing a portion of the receiving container on which the light source module is received on an inner space of the light source cover, so that the sidewall cover portion makes contact with the sidewall, the light source cover portion covers the light source module, and the lower end portion makes contact with the bottom portion.

17. The method of claim 16, further comprising:
moving a top chassis, which includes a panel supporting part and chassis sidewalls, on the display panel along a direction substantially perpendicular to the first direction; and
combining the top chassis with the receiving container, so that the panel supporting part makes contact with an edge portion of the display panel, and an inner surface of the chassis sidewall corresponding to the sidewall of the receiving container facing the light source module makes contact with the light source cover.

18. The backlight assembly of claim 1, wherein a portion of the bottom portion of the receiving container is disposed between the lower end portion of the first light source cover and the light source cover portion of the first light source cover.

19. The display device of claim 18, wherein the light source cover portion bent from an opposite side of the first side of the sidewall cover portion toward a direction identical to a bent direction of the lower end portion and disposed opposite to the lower end portion, the light source cover portion being disposed on the first light source module.

20. The display device of claim 9, wherein a portion of the bottom portion of the receiving container is disposed between the lower end portion of the first light source cover and the light source cover portion of the first light source cover.

21. The display device of claim 20, wherein the light source cover portion bent from an opposite side of the first side of the sidewall cover portion toward a direction identical to a bent direction of the lower end portion and disposed opposite to the lower end portion, the light source cover portion being disposed on the first light source module and
wherein the light source cover portion extends from an opposite side of the sidewall cover portion toward the light guide plate to cover the first light source module and a portion of the exiting surface.

\* \* \* \* \*